July 15, 1952  A. A. MUEHLING  2,603,323
CLAMP OPERATING AND LOCKING MEANS
Filed April 30, 1947

INVENTOR.
Anthony A. Muehling
BY
ATTORNEY.

Patented July 15, 1952

2,603,323

UNITED STATES PATENT OFFICE 2,603,323

CLAMP OPERATING AND LOCKING MEANS

Anthony A. Muehling, Detroit, Mich.

Application April 30, 1947, Serial No. 745,084

4 Claims. (Cl. 192—8)

This invention relates to operating and locking means for a work piece clamp and has for its object the provision of such a means which shall be of simple and economical construction and efficient in operation, providing for locking and releasing of a work piece in a clamp by simple manual manipulation of an operating handle.

A further object of the invention is the provision of an operating and locking means for a work piece clamp wherein the work is positively held and is not subject to involuntary release by loosening under vibration.

Another object of the invention is the provision of an operating and locking means for a work piece clamp including stationary and rotatable members carrying cam surfaces with which a transversely movable cam member cooperates to provide a wedging and locking action with the cam member providing the driving connection between a manual operator and the operating parts of the clamp.

Other objects and features of the invention will be readily apparent to those skilled in the art from the specification and appended drawing illustrating certain preferred embodiments in which.

Figure 1:
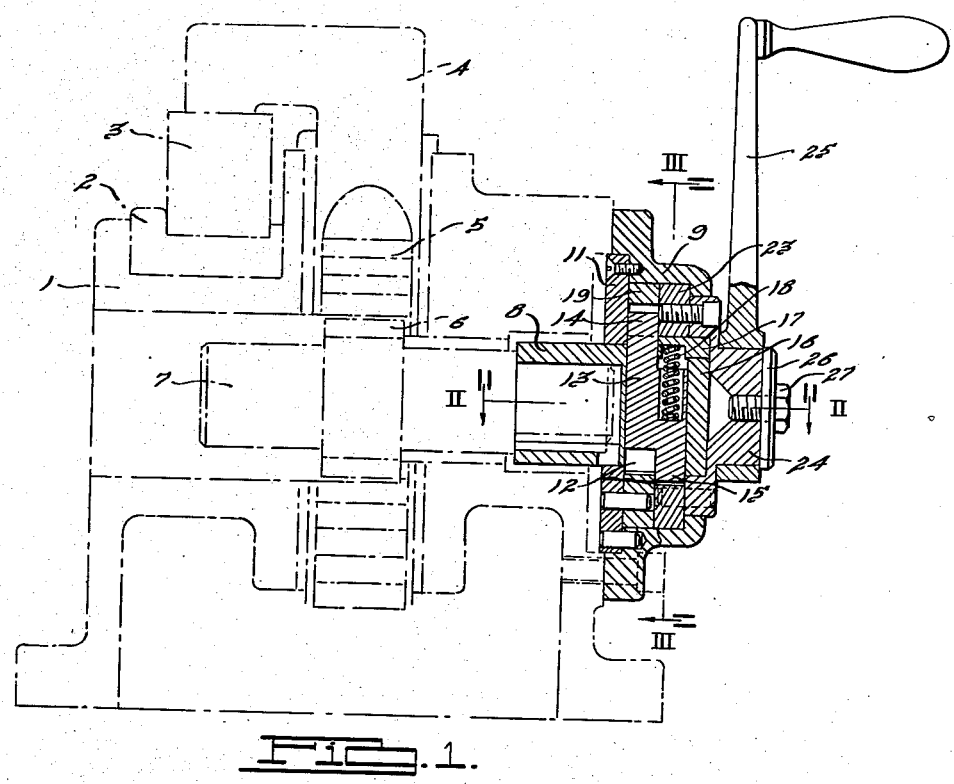
Figure 1 is a vertical sectional view through the operating and locking means of the present invention, with the clamping elements with which it cooperates diagrammatically shown.
Figure 2:
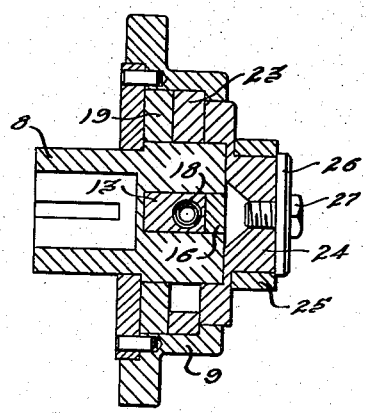
Figure 2 is a horizontal sectional view on the line II—II of Figure 1.

In the drawing there is diagrammatically shown a base 1 adapted for mounting in a metal working machine, such as a milling machine, shaper, etc., and carrying a work holder 2 in which is disposed a work piece 3 to be clamped in operating position. A clamping arm 4 is rectilinearly movable in the base 1 and is operated by a rack 5 meshing with a pinion 6 carried by a shaft 7 journaled in the base 1 and keyed to a rotatable hub 8 forming a part of the operating and locking means.

Mounted upon the base 1 is a stationary casing 9 closed by a stationary back plate 11 through which extends the rotatable hub 8. Interiorly of the casing 9, the hub 8 is provided with a transverse slot 12 in which is disposed a cam member 13 having end portions 14 and 15 axially offset as shown in Figure 1. The slot in hub 8 is closed by end filler piece 16 and top filler piece 17, and between the top filler piece 17 and the cam member 13 is disposed a spring 18 biasing the cam member 13 transversely.

Figure 3:
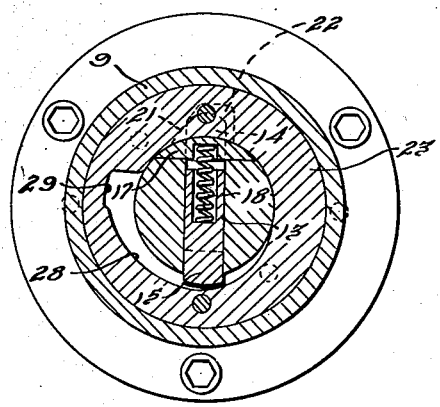
Figure 3 is a vertical sectional view on the line III—III of Figure 1.

Within the casing 9 and pinned to the back plate 11 is a stationary cam plate 19 carrying a short steep cam surface indicated by dotted line 21 in Figure 3. The major interior surface of the plate 19 is cylindrical except for the notch at 22 of which the cam surface 21 forms one side. Within the casing 9 forwardly of the plate 19 is a second but rotatable cam plate 23 which is attached to a rotatable hub 24 extending through the forward surface of the casing 9 and having mounted thereon an operating handle 25 by means of a clamping plate 26 and stud 27.

It will be seen, from Figure 1, that the ends 14 and 15 of the cam member 13 are offset sufficiently so that the end 14 cooperates only with the stationary cam plate 19 while the end 15 cooperates with the rotatable cam plate 23. The interior surface of the cam plate 23, as more particularly shown in Figure 3, is cylindrical in part and includes a camming surface 28 of gradually increasing diameter terminating in a notch 29 of a size to receive the end 15 of the cam member 13. The parts as shown in the drawing are in the locked or clamping position, with the cam member 13 wedging the cam plates 19 and 23 together to prevent retractal rotation of the hub 8, the wedging being to a degree manually determined by rotation of the handle 25, with the end 15 of cam member 13 engaging the cam surface 28 of plate 23 and the end 14 of cam 13 engaging the cam surface 21 of plate 19.

To release the clamp, the handle 25 and the hub 24 and cam plate 23 attached thereto are rotated in a counterclockwise direction as viewed in Figure 3. The cam member 13 will, in this operation, move downwardly as viewed in Figure 3 under the bias of spring 18 until the end 15 of the cam member engages in the notch 29 in plate 23. Continued rotation of handle 25 and plate 23 effects rotation of the cam member 13, and, hence, of the hub 8 in which the cam member is keyed. This rotates the shaft 7 and through pinion 6 and rack 5 elevates the clamping arm 4 to release the work piece 3. When the end 15 of the cam member 13 is received within notch 29, the end 14 of the cam member will be retracted out of the notch 22 and will be free to rotate within the cylindrical portion of the plate 19.

After the work piece has been removed and another inserted in the work holder 2, it is clamped in position by rotating the handle 25 in a clockwise direction as viewed in Figure 3. In the initial clamping operation, the end 15 of cam member 13 is retained in the slot 29 so that the rotatable parts move together as a unit with the positively rotated cam plate 23 driving the cam member 13 and the hub 8 connected to the cam operated parts. After clamping arm 4 engages the work piece 3 with sufficient force to retract the end 15 of cam member 13 from the notch 29, the hub 8 becomes stationary and the cam plate 23 rotates relative thereto. With a work piece of a thickness within the range for which the lock is designed the end 14 of cam member 13 is now opposite the notch 22 and upon continued rotation of the handle 25 and cam plate 23, the cam member 13 is moved upwardly as viewed in Figure 3 against the bias of spring 18 as the end 15 rides along the cam surface 28 to portions of decreasing diameter. This transverse rectilinear movement of the cam member 13 continues until the end 14 thereof is tightly wedged against the cam surface 21 of the notch 22 in the stationary cam plate 19, at which time the clamp is locked by the wedging action of the cam member 13 by the engagement of its ends 14 and 15 with the cam surfaces 21 and 28 on the stationary and rotatable cam plates 19 and 23. In this position, which is shown in all of the figures of the drawing, the work piece is securely held in the clamp which is prevented from retractal movement and from involuntary release by loosening under vibration. After the working operation the work piece is released in the manner originally described.

It will, of course, be understood that the operating and locking means of this invention is of the "range" type and is designed for a workpiece of a predetermined range of thickness. This range will be determined by the angular width of the cam surface 21 and by the relation between rack 5 and pinion 6.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. Operating and locking means for a movable clamp comprising a rotatable shaft adapted to operate said clamp, a driving member keyed in said shaft for rotation therewith and for rectilinear movement transversely of the axis thereof, a stationary cam surface cooperating with one end of said driving member, a rotatable member having a cam surface of progressively varying diameter cooperating with the other end of said driving member, means adjacent the larger diameter end of the cam surface on said rotatable member for releasably engaging said other end of said driving member to interconnect said shaft and said rotatable member to operate the clamp, said shaft becoming stationary as the clamp is engaged whereby said connection is released and the driving member moved rectilinearly as it rides along the cam surface on said rotatable member to effect locking of the clamp by wedging of the opposite ends of the driving member against said stationary cam surface and the cam surface on said rotatable member.

2. Operating and locking means for a movable clamp comprising a rotatable shaft adapted to operate said clamp, a driving member keyed in said shaft for rotation therewith and for movement transversely of the axis thereof, said driving member having cam portions at its opposite ends offset longitudinally of the shaft axis, a stationary cam surface adapted to cooperate with one of said cam portions in the locked position of the clamp, a rotatable member having a cam surface thereon of progressively varying diameter cooperating with the other cam portion and having a notch therein adjacent the larger diameter end of its cam surface adapted to receive said other cam portion, spring means biasing said driving member to engage said other cam portion with the cam surface and notch in said rotatable member, the notch and cam portion engagement effecting a driving connection between said rotatable member and shaft to operate the clamp, said shaft becoming stationary as the clamp is engaged whereby the driving member thereafter moves rectilinearly only while said other cam portion rides along cam surface on said rotatable member to effect locking of the clamp by wedging of said cam portions against the stationary and rotatable cam surfaces.

3. Operating and locking means for a movable clamp comprising a rotatable shaft adapted to operate said clamp, a driving member keyed in said shaft for rotation therewith and for movement transversely of the axis thereof, said driving member having cam portions at its opposite ends offset longitudinally of the shaft axis, a stationary cam plate having an opening receiving said shaft and driving member and provided with a relatively steep cam surface adapted to be engaged by one of said cam portions in the locked position of the clamp, a rotatable cam plate having an opening receiving said shaft and driving member and provided with a cam surface of gradually increasing diameter terminating in a notch receiving the other of said cam portions, spring means biasing said driving member to press said other cam portion against said rotatable cam surface and in said notch, an operating handle rigidly connected to said rotatable cam plate, engagement of said other cam portion in said notch providing a driving connection for effecting rotation of said shaft by said operating handle to operate the clamp, said shaft becoming stationary as the clamp is engaged whereby continued movement of the operating handle effects relative movement between said rotatable cam plate and driving member to effect rectilinear movement of the driving member as said other cam portion rides along the rotatable cam surface to move said one cam portion into engagement with the stationary cam surface and effect locking of the clamp by wedging said cam portions against said stationary and rotatable cam surfaces.

4. Operating and locking means for a movable clamp comprising a rotatable shaft adapted to operate said clamp, a driving member keyed in said shaft for rotation therewith and for movement transversely of the axis thereof, said driving member having cam portions at its opposite ends offset longitudinally of the shaft axis, a stationary cam plate having an opening therein providing an interior surface receiving said shaft and driving member, the major portion of said interior surface being cylindrical except for a notch therein at least one side of which is constituted by a relatively steep cam surface, a rotatable cam plate having an opening therein providing an interior surface receiving said shaft and driving member, the interior surface of said rotatable cam plate having an elongated gradual cam surface terminating at its larger diameter in a notch, one of the cam portions on said driving member cooperating with the interior surface of the stationary cam plate and the stationary cam surface thereon, the other of said cam portions cooperating with the cam surface and notch in said rotatable cam plate, spring means biasing said driving member to press said other of said cam portion against said rotatable cam plate, engagement of said other cam portion and notch providing a driving connection between said rotatable cam plate and shaft for operating the clamp as the cam plate is rotated, said shaft becoming stationary as the clamp is engaged, at which time said one cam portion is disposed opposite the notch in said stationary cam plate, whereby upon continued rotation of the rotatable cam plate the driving member moves rectilinearly as said other cam portion rides along the rotatable cam surface to effect locking of the clamp by wedging of the cam portions against the cam surfaces on the stationary and rotatable cam plates.

ANTHONY A. MUEHLING.

REFERENCES CITED

The following references are of record in the file of this patent:

UNITED STATES PATENTS

| Number | Name | Date |
| --- | --- | --- |
| 1,595,499 | Birk | Aug. 10, 1926 |
| 1,900,852 | Kuppersmith | Mar. 7, 1933 |
| 1,946,048 | Verderber | Feb. 6, 1934 |
| 2,381,480 | Albrecht et al. | Aug. 7, 1945 |